(12) United States Patent
Ellis

(10) Patent No.: US 6,484,257 B1
(45) Date of Patent: Nov. 19, 2002

(54) SYSTEM AND METHOD FOR MAINTAINING N NUMBER OF SIMULTANEOUS CRYPTOGRAPHIC SESSIONS USING A DISTRIBUTED COMPUTING ENVIRONMENT

(76) Inventor: Alonzo Ellis, 335 Elan Village La., San Jose, CA (US) 95134

(*) Notice: Subject to any disclaimer, the term of this patent is extended or adjusted under 35 U.S.C. 154(b) by 0 days.

(21) Appl. No.: 09/259,885

(22) Filed: Feb. 27, 1999

(51) Int. Cl.[7] .............. H04K 1/10; H04L 9/08; H04L 9/12; H04L 5/20
(52) U.S. Cl. .............. 713/153; 713/201; 380/33; 380/34; 380/279
(58) Field of Search .............. 713/153, 201; 380/33, 34, 37, 38, 279; 370/325, 326, 343, 480; 375/240; 455/59, 61

(56) References Cited

U.S. PATENT DOCUMENTS 5,966,442 A * 10/1999 Sachdev .............. 380/10
6,134,225 A * 10/2000 Pham et al. .............. 370/316
6,195,751 B1 * 2/2001 Caronni et al. .............. 713/163

* cited by examiner

Primary Examiner—Justin T. Darrow
(74) Attorney, Agent, or Firm—Michael Hetherington; Woodside Intellectual Property Law Group

(57) ABSTRACT

An N session distributed architecture provides a software solution to the major computational challenges faced with providing secure communication. A registration entity is identified as the session arbitrator through which N devices on a network dynamically participate in establishing, maintaining and destroying cryptographic sessions. Session keys are generated by one or more devices registered with the registration server. Multiparty key agreement is used to pass session keys to all parties involved in the encrypted session. All sessions appear to be local to the arbitration server, however individual session are maintained by several devices operating as a collective. Encrypted stream partitioning and computational resource allocation to decrypt the individual partitions in such way as to ensure system stability with increasing session demands is introduced in the architecture. This provides a cryptographic system architecture with encryption/decryption processing power limited only by the number of participants in the collective and network bandwidth or latency.

10 Claims, 15 Drawing Sheets

SYSTEM AND METHOD FOR MAINTAINING N NUMBER OF SIMULTANEOUS CRYPTOGRAPHIC SESSIONS USING A DISTRIBUTED COMPUTING ENVIRONMENT

FIELD OF THE INVENTION

The field of the present invention relates generally to the encryption and decryption of data conducted over a distributed computer network. In particular, the field of the invention relates to a software architecture for conducting a plurality of cryptographic sessions managed over a distributed computing environment.

An N session distributed architecture is described which solves the problems encountered with providing a secure network. The present software solution boosts performance to previously unattainably high levels and provides a practical security solution capable of servicing N simultaneous cryptographic session using a distributed computing environment without additional encryption decryption hardware at wire-speed levels. An aspect of the invention provides a solution, which overcomes the network bandwidth latency barriers to secure encryption. Another aspect of the invention provides a scalability solution to the problem of processor saturation due to encryption decryption loads.

BACKGROUND

There is a growing need to provide for secure commerce on computer networks, which does not require costly non-scalable computational resources. Corporations now have critical needs for ensuring the security of data that traverses their networks. Information Systems (IS) managers have attempted to cope with those needs by installing and managing expensive hardware to provide protection of data. In the case where data must be transferred between sites, IS managers can dictate their security needs to the telephone companies who manage the transfer of data between multiple sites. However, there are several problems limiting the transfer of data networking. Such concerns are as follows:

Network Availability (also known as uptime);

Network bandwidth (the amount of data that the overall network can handle over a particular time slice);

Quality of Service: ensuring that pre-determined service levels, such as bandwidth congestion allowances and network latency, are consistently met for all hosts connected to the network;

Security: ensuring that sensitive data are protected as it traverses the network and those unauthorized parties do not compromise that data or the network itself.

Monitoring/Auditing (the capability to verify that the above needs are being met and the ability to instantly detect and react to any deviation from preset expectations).

When considering a new technology that will impact a network, an IS manager must address the foregoing issues. After these requirements are met, factors of cost and scalability must be considered. IS managers are constantly looking for ways to meet the above requirements while reducing the cost of supporting their network. Managing the cost of expanding a network to address increased bandwidth requirements of users is a major problem for IS managers today.

Point-to-Point Encryption

Point-to-point link level encryption has a disadvantage in that it is not scaleable. For example, there is a dramatic and non-linear cost difference in installing and maintaining a 128 k Frame Relay link versus a 1.544M Frame Relay link. The cost problem is not limited to bandwidth, but rather is also greatly affected by the addition of new groups of hosts as additional connection points. Related equipment also must be installed and maintained. Point-to-point encryption also has cost disadvantages. Point-to-point link level encryption is usually all or none meaning that all data both public and private are encrypted over this link. This additional overhead is acceptable in some cases but undesirable in others.

Since link level encryption requires static routes to be created it does not integrate easily into the Internet paradigm, which requires packets to be dynamically routed from point to point. A network layer (or higher) encryption solution is required in order to fit easily into the framework of routable IP packets. Currently there exists a transport level security mechanism for application programs using SSLv3 (secure sockets layer). SSL was developed in 1995 when a universally recognized security mechanism at the IP layer did not exist. This has been the most commonly used protocol for providing secure applications.

The three protocol capabilities of SSL include authentication, encryption and key exchange. In IPSec these are provided as separate protocols (AH, ESP and IKE).

In SSL most of the communications protocol data is passed in plaintext, only the application header and actual data sent to the application is cryptographically protected. The encryption and integrity protection for the data and not the communications as in IPSec, which protects both, are handled by the record protocol. The negotiation of new crypto algorithms and keys is handled by the handshake protocol. Finally, any errors that have occurred are handled by the alert protocol. SSL maintains its security state based on the session associated with a particular set of host addresses and ports.

SSL sessions are established in four steps. In Step 1 the sender sends a hello message to the receiver containing random data. In Step 2 the receiver sends the sender his/her public key embedded in a signed certificate. In step 3 the sender encrypts a shared secret key and a change cipher spec switch (to determine the proper cipher to use) with the receiver's public key and sends it to the receiver. In step 4 the receiver sends a reply using the shared secret key (after decrypting the info in step 3 with his private key) and a "finished" message. Both sides now can begin communications. Using the record protocol, all data that passes between the two parties are encrypted and hashed and the recipient checks this hash upon decryption to make sure that the data have not been modified in transit.

The newest version of SSL (3.0) supports RSA key exchange, Diffie-Hellman anonymous or signed (the most common implementation is SKIP) and Fortezza using SKIPJACK. TLS (Transport Level Security) and PCT (Private Communication Technology) by Microsoft are both variations on SSL that are vying for standards approval by the IETF. A major disadvantage of all versions of SSL is that SSL is ineffective against many of the newer communications level (below transport level) attacks, which are technically called SYN Flooding, Buffer Overruns and Traffic Analysis.

IPSec

IPSec is a conventional protocol for securing IP traffic as it traverses the Internet, an Extranet or any IP based local, metropolitan or wide area network. IPSec can be incorporated with Ipv4 to provide security for host to host, host to subnet and subnet to subnet communications, which are not available with SSL.

The objective for securing large corporate networks is to allow the proper insiders or outsiders to access corporate data transparently while keeping unintended parties from accessing the same data or denying service to those who should be accessing the data. In the past, Firewalls have been used as a means for filtering incoming and outgoing traffic. Firewalls have been combined with access servers to authenticate parties before they are allowed access to any resource inside or outside the firewall.

Firewalls have evolved to include new protocols that allow them to safely transfer data between themselves and another party over the Internet. This function is known as creating a virtual private network (a private network over the public Internet).

The IPSec protocol uses two underlying protocols to send data securely. IPSec adds two additional packet headers to a packet to handle each of the two protocols. The headers both contain a numerical value known as the SPI (security parameters index) to identify the crypto keys and procedures to use with it. The first header, AH (authentication header), provides integrity checking and keying information to keep attackers from computing alternate checksums that check correctly. The second header, ESP, encrypts the contents of the remainder of the packet.

IPSec supports a number of algorithms for authentication and encryption. Examples are KeyedMD5 and SHA-1 (for AH), DES, Triple DES, and RC4 (for ESP). In addition to this, IPSec automatically handles the creation of security associations between hosts through key management.

Manual keys can be used which allow hosts to be configured manually with the proper shared secret keys. More common is the use of Simple Key Interchange Protocol (SKIP) which negotiates and exchanges session keys between IPSec hosts. ISKAMP (Internet Security Association and Key Management Protocol) is a general purpose protocol intended to manage security associations and manage key exchanges using Oakley or IKE. Tunneling is also used. In tunnel mode the final destination IP header is encrypted and a gateway IP header is added to allow router to route the packet to the gateway server. In transport mode the IP header is not encrypted.

IPSec is meant to protect traffic between hosts. However, with the wide range of applications currently in use (email, browsers, file transfer, remote terminal access, multimedia, database and so on) it becomes cumbersome to implement.

IPSec provides an advantage over SSL because it can protect against the newer protocol attacks such as SYN flooding and buffer overruns. In the SYN flooding attack mentioned above IPSec would block illegitimate SYN messages because they require a valid AH with a valid cryptographic checksum. Attackers cannot generate numerous requests from random hosts because they cannot generate a valid AH for every such host. In the buffer overrun attack, the destination host will discard any IP packets which are not properly formatted for IPSec. That is, packets must come from a valid host and be properly formatted for TCP before TCP processes them, thereby protecting the host from this type of attack.

Although SSL and IPSec can be combined to gain added protection and flexibility, these systems fail to address the problems of increased cost of implementation and scalability. Another major problem not addressed by SSL and IPSec is managing the cost of expanding a network to address increased bandwidth requirements of users.

The introduction of constantly changing standards and encryption/decryption schemes has greatly increased the burden on computer resources to provide secure communication. The computational demands are currently being addressed with the addition of special encryption/decryption ASICs (Application Specific Integrated Circuits) or hardware. However, as hosts are called, a doubling of hardware must be added to meet demands from both source and sink ends.

A conventional attempt to address the above deficiencies includes the use of hardware to handle encryption and decryption of data traffic. However, this is expensive and slow in that it increases the computational burden on the CPU when encrypting and decrypting data. The hardware approach also has a disadvantage in that it is not scaleable.

Alternative software architectures have been tried and discarded. The conventional software point to point client server model cannot scale adequately. Increased demand for secure sessions can lead to system failure as processing resources become unavailable on either side. Employing a central server model has been tried and found inadequate. The central gateway server in a distributed system environment becomes saturated with increased demand for decryption services. Tests were done to compare the performance of a conventional centralized server architecture model, as in FIG. 1, against an invention architecture topology in FIG. 2. These configuration performance tests and results are discussed infra Conventional distributed architecture is unable to manage the increase in secure session demand due to instability arising from uneven processor computational loads, propagation delays and computer or network latency, all of which cause loss in synchronicity with collective processors. For these reasons current solutions are inadequate to overcome the barriers mentioned above.

Therefore, what is needed is a new method for encryption/decryption which is infinitely scaleable in the number of simultaneous sessions capable of being processed by a server.

What is also needed is an encryption/decryption system which is infinitely scaleable in terms of bandwidth between clients and servers.

What is also needed is an easily implemented software solution which provides end-to-end encryption/decryption in a distributed network while increasing processing power which eliminating latency as bandwidth increases.

SUMMARY

In accordance with the foregoing and other objectives, an aspect of the invention provides a distributed software solution for encryption/decryption which is infinitely scaleable in the number of simultaneous sessions capable of being processed by a server and in terms of bandwidth between clients and servers. Another aspect of the invention provides end-to-end encryption in a distributed network and combines the processing power of all computers connected to the system to enable bandwidth to be infinitely scaleable and to reduce latency substantially to zero.

Another aspect of the invention provides a software architecture for encryption/decryption by partitioning the client traffic into units which can be processed across a distributed network of hosts without introducing network instabilities. A further aspect of the invention increases packets per second throughput and overcomes latency. Another aspect of the invention implements a mathematical method ensuring a stable partitioning and processing of encrypted traffic to meet the increase in secure session demand.

In accordance with another aspect of the invention, the software architecture has three primary components:

Manager, Client and Agent. The manager software resides on a gateway server and manages all aspects of controlling the system. Client, server, and agents are created on the manager. The manager controls client access levels. Certificate information is imported and stored by the manager or optionally generated by the manager. The manager does performance monitoring. The manger performs auditing. Network address translation is handled by the manager for tunneled traffic from the client The client software resides on the desktop of internal hosts, the desktop/laptop of remote users and the desktops of remote offices. The Client software provides a simple GUI interface for clients to configure dial-up information and use either a dial-up connection or a network connection to the local VPN server.

The agent software handles the negotiation of security keys, security associations and establishes the IPSec link between itself and the server. Agent software can run as a stand alone process or exist as part of the client software. The agent software is responsible for encrypting and decrypting communication traffic as it arrives from the clients via the server. All of the agents operate as distributed system to share the load of the encryption and decryption over all of the agent CPUs.

BRIEF DESCRIPTION OF THE DRAWINGS

These and other aspects and advantages of the invention may be appreciated from the following detailed description together with the drawings in which.

DETAILED DESCRIPTION

In accordance with an aspect of invention, the manager or main server, agent and client are all designed to operate transparently within any distributed network which uses an internet protocol (IP). Examples of such distributed networks may employ Ethernet, Token Ring, Synchronous Optical Network (SONET), ATM, Gigabit Ethernet networks, or the like. They will not disrupt network traffic flowing on the host machines or on the wire. The invention uses client server and agent technology to establish end to end or "final mile" security links to the final destination inside the business network.

Manager Initialization

Figure 4:
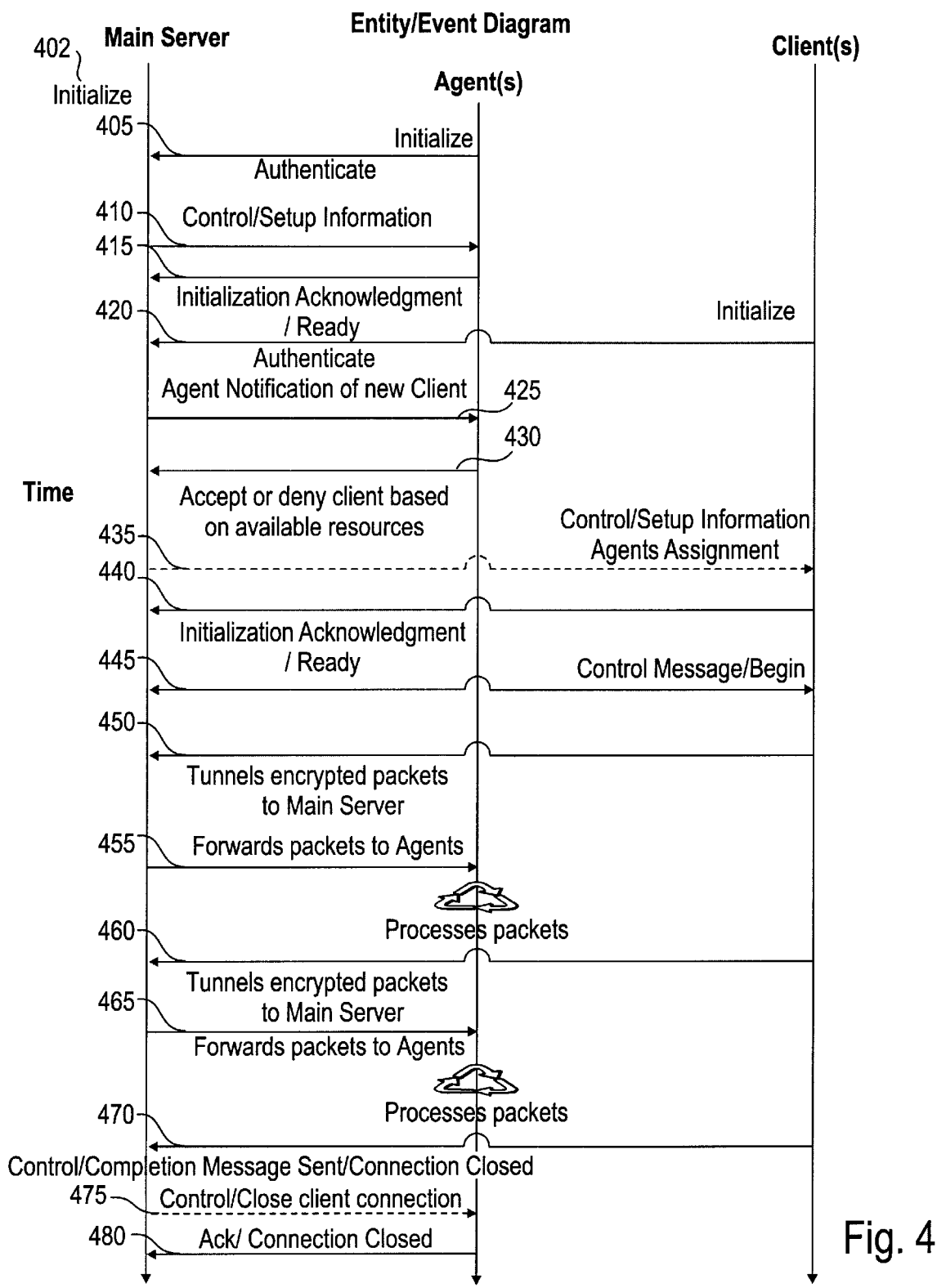
FIG. 4 shows an abbreviated entity/event diagram in accordance with an aspect of the invention.

Referring to FIG. 4, the manager will load the policy file (or read it from the database) upon initialization. The IKE engine will start on the server and receive setting information from the server daemon based on what it has loaded from the policy file. Encryption/decryption settings will be set, integrity checking settings will be set, re-keying settings will be set and access time information will be set on the manager. At this point, the server (and IKE engine) will establish a connection with the agents listed in the policy file and (after establishing a secure session) upload VPN rules (security associations, network address translation tables, etc) to the agent.

Agent Initialization

Referring to the event diagram in FIG. 4, upon initialization the agent performs an authenticated DH key exchange in order to establish a session key with the Manager. To prevent "man in the middle" attacks the agent's and server's certificates are attached to the messages exchanged (along with signatures and message digests to verify the certificates and to make sure the message is not modified in transit) for session key negotiation. After a session key is established the manager sends the SA and vpn policy information to the agent and the IKE engines on the manager and agent exchanging keying information.

Client Initialization/Authentication

Upon initialization the client contacts the gateway server and authenticates using RADIUS, TACACS+, a pre-shared password or X.509 certificate. Once the client is authenticated, it negotiates the session key with the gateway server. After the session key is established, the client downloads the VPN policy information from the server (security associations, network address translation tables, etc). With the VPN policy information established, the client's IPSec engine begins communication with the gateway server and ultimately with the final destination.

CryptoScale

Cryptoscale is the invention architecture comprised of manager or main server, agents and clients to boost performance to exceptional levels without the use of additional hardware. This technology allows software-based VPN solutions to perform at wire-speed levels. The architecture is based on an asynchronous distributed model but provides critical key synchronization within some components of the architecture. The system consists of separate components, agents that exist as atomic objects with zero wait states, that process data in an arbitrary order and at arbitrary relative speeds. Specific timing considerations are ignored with the exception of re-keying time constraints and IP time-to-live. The entire system is modeled as a finite state machine. Transitions in state are caused by an encryption/decryption computation (a DES CBC block for example) on an agent. There is a synchronizer component in the gateway server, which handles the problems that exist in managing an asynchronous system. FIG. 4 shows the protocol and process sequence, which transpires between the manager, agent(s) and client(s) entities. In the timing model, the exact order can be altered without departing from the scope of the invention. For instance, the FIG. 4 shows that the agent initializes and authenticates before the client initializes and authenticates. This order is not limited to the precise sequence shown in FIG. 4 and some steps can be interchanged without affecting the encryption/decryption aspect of the invention.

Timing Model

Below is a discussion regarding the events that transpire between the main server, agent(s) and client(s). Only an abbreviated number of the events mentioned are shown in FIG. 4 and only to impart the very basic ideas in establishing secure session environment, initiating secure sessions, transferring secure sessions and terminating secure sessions.

First the Main Server starts up, wherein a registry is created and initialized and the server begins execution 402. The Agent Server(s) register themselves 405 with the Main Server and define session key(s) with which to establish secure communications. The Main Server and Agent Servers become enabled to receive secure connections from Clients 410 and 415. The Client(s) connects to the Main Server and authenticates using one of several servers known authentication methods 420. The Main Server determines if it can accept a new session based on its current available processor bandwidth. If the Main Server can accept a new session based on available processor resources, then it agrees on a secret session key with the Client(s) and begins the session (s). If the Main Server has insufficient resources to service the session 425, then it will instruct an Agent Server(s) to become unblocked [wake up] and participate in a multiparty key exchange between a Client, Main Server and Agent Server. If the Agent Server has insufficient resources it will notify the server that it cannot accept a new client session or maintain an existing one. If none of the Agent Servers can accept a new client connection then the server can handle the additional load or deny the connection based on configuration settings. If the Agent Server loses resources it will request that the Main Server pass the client connection to a new Agent which the Main Server will attempt to do. If the Main Server cannot pass the connection it will either attempt to handle the load itself or notify the client and close the connection. If the Agent Server abruptly shuts down the Main Server will automatically pass the client connection to a new Agent Server or attempt to handle the load itself and 435 and 440. The Main Server will notify both Client and Agent Server of the correct cipher to use for the session. The Main Server will notify both Client and Agent Server of any special information such as special ciphers for the different types of communication formats. The Main Server will notify the Client and Agent Server of each other's addresses. The Client and Agent will independently generate a session key to exchange data. The Client will then begin encrypting its session communication to the Agent Server (via the Main Server gateway) using the key and information obtained from the Main Server. The Agent Server will decrypt the session communication and redirect this decrypted communication to the intended final destination. If the Client specifies an end peer to connect to directly, then the Main Server will attempt to redirect the Client to the peer Agent Server after authenticating both parties 450 and 460. The Main Server maintains a list of connections [sessions] and associated session information (session keys, etc)in the registry wherein a session redirect or special circumstances may require this information to initiate further action. Upon successfully transferring a session to an Agent Server, the Main Server will terminate the thread of an encrypted session communication with the Client but maintain information in the step previous to this one. At this point the Main Server will serve only to synchronize the Client and Agent communication via network address translation 455 and 465. If any Agent Server currently servicing a Clients becomes saturated [overloaded or processor resource insufficient], it notifies the Main Server to pass the session on to another Agent Server. If the Main Server receives notification from an Agent Server that it is saturated, then the Main Server finds an alternate available Agent Server and passes the secret key and security association information corresponding to that session to the said alternate Agent Server and securely notifies the impacted Client to redirect itself to the said alternate Agent Server. The Client connects to the alternate Agent Server and a secure session is continued. Upon receiving notification of a successfully redirected session from the said alternate Agent Server, the Main Server will notify the said saturated Agent Server that the said session was successfully redirected. The saturated Agent Server wishing to terminate the session then terminates the session after it receives confirmation from the Main Server that the Client was successfully redirected. If a client or Server signals a session is concluded then a termination message is sent to the Main Server which then registers the session in the registry as terminated 475 and 480.

An overall system algorithm proceeds as follows:
1. The client authenticates to the main server
2. The server gets the client information including the bandwidth requirements to determine how many agents to assign to the client
3. The server sends the client a NAT (Network Address Translation) table, which is used to forward IP packets from host to another host. The NAT table contains the actual IP addresses of assigned agents
4. The server sends the agents a NAT table update to add the client to their existing client list
4a. The server initiates a dataflow test to ensure that the microflows from each agent will be reassembled properly by the TCP/IP module on the destination. If packet re-sequencing is beyond the allowed window limits by TCP/IP then the server will redirect the micro flows through other agent or use fewer agents in the session.
5. The client and agent perform an authenticated Diffie Hellman exchange in order to negotiate the session key and proper security association
6. The client begins the encryption process
   Packet 1 is tunneled to agent 1
   Packet 2 is tunneled to agent 2
   Packet 3 . . .
   Packet N is tunneled to agent 1 by some mutually established order e.g., round robin.

Figure 5A:
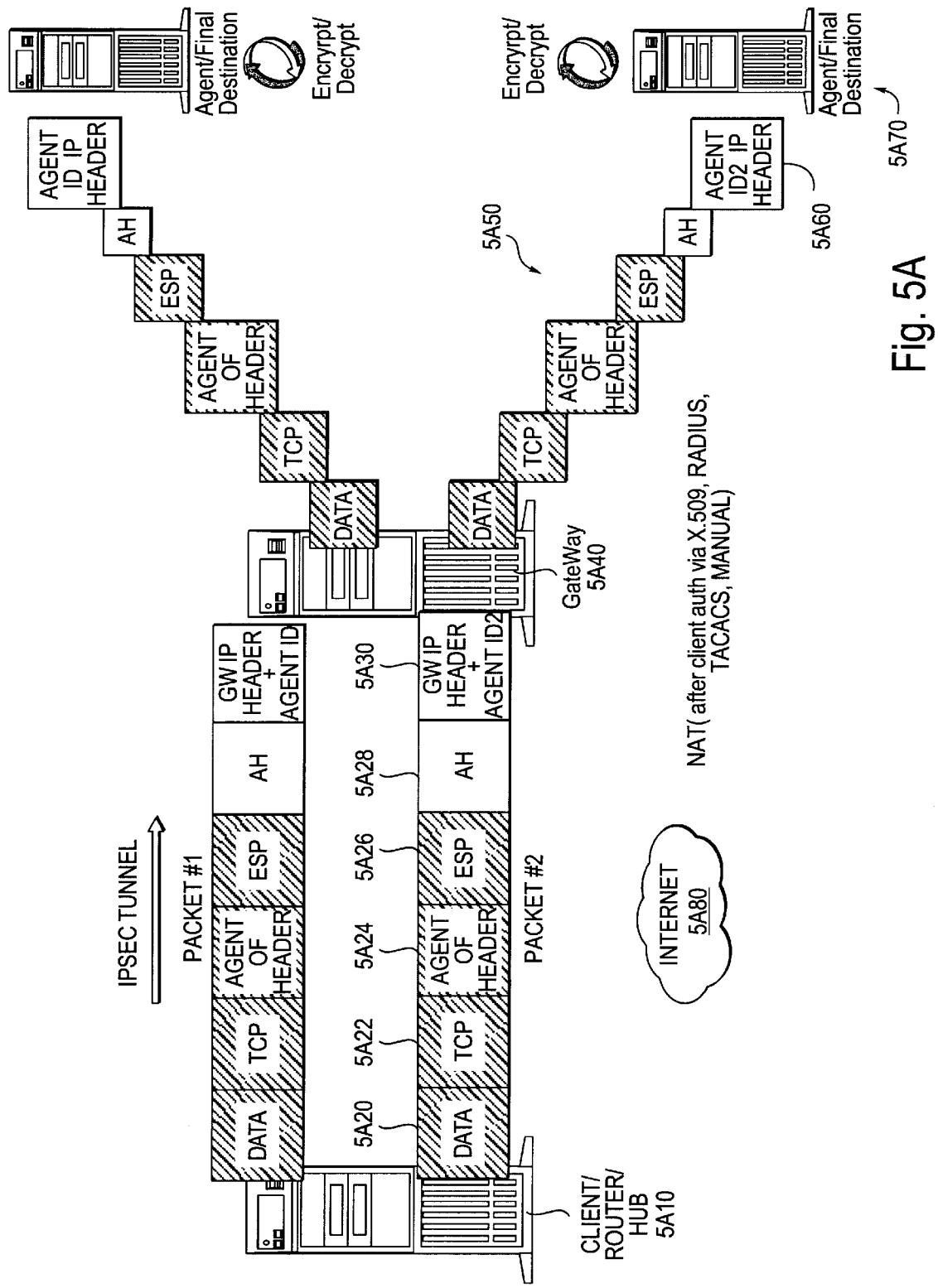
FIG. 5A shows a tunneling packet Network Layer Model decomposition in accordance with an aspect of the invention.
Figure 6:
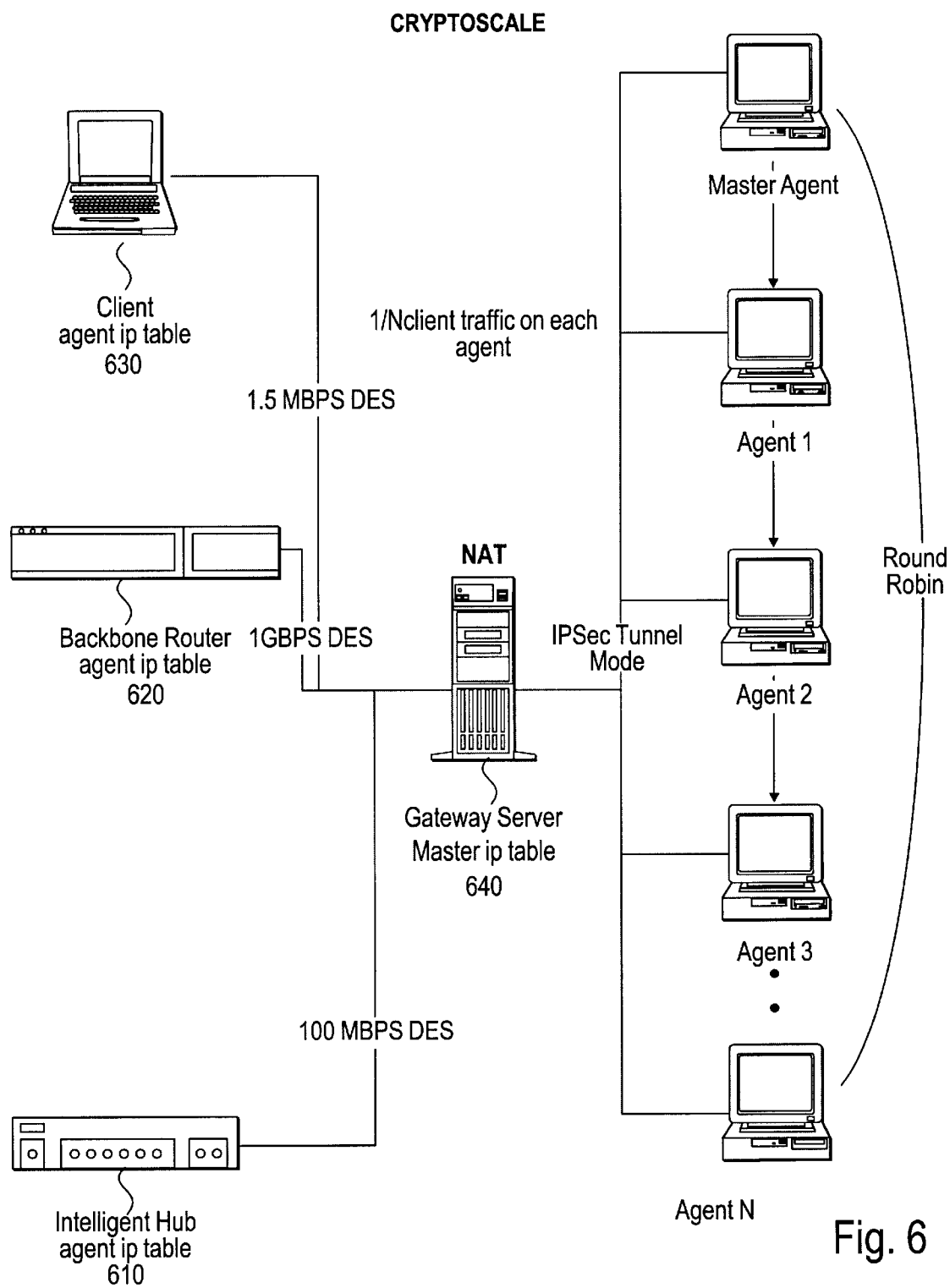
FIG. 6 shows a distributed network topology for the invention architecture in accordance with an aspect of the invention.

Individual packet network layer model decomposition is shown in FIG. 5A for two clients outgoing secure packets. The packets are shown broken down by network layer model components and show an aspect of packet processing at the various locations. The tunneling packets traveling from the client 5A10 each contain DATA 5A20, TCP 5A22, AGENT IP HEADER 5A24, ESP 5A26, AH 5A28, and GATEWAY HEADER+AGENT HEADER 5A30 components. These two packets are sent across the Internet 5A80 to the Gateway 5A40. The Gateway then strips the GATEWAY HEADER+ AGENT HEADER 5A30 and preappends an AGENT ID IP HEADER 5A60 for a packet composed of output packet 5A50. The encrypted stream (forward direction) is more generally, partitioned among N agents. A basic distributed network topology is shown in FIG. 6 Cryptoscale Configuration. FIG. 6 depicts a simple distributed topology of the invention architecture. 610, 620, and 630 show potential sources for clients needing secure communication service. These all contain an agent IP table or list of available agent's IP addresses assigned to that particular client. Each client table may have a different list of agents based on client needs and server resource scheduling. These can then employ IPsec tunnel mode through Gateway server at 640, which contains the NAT, Network Address Translation, table and master IP tables and then on to assigned agents at 650, where decryption is accomplished in parallel fashion.

Figure 5B:
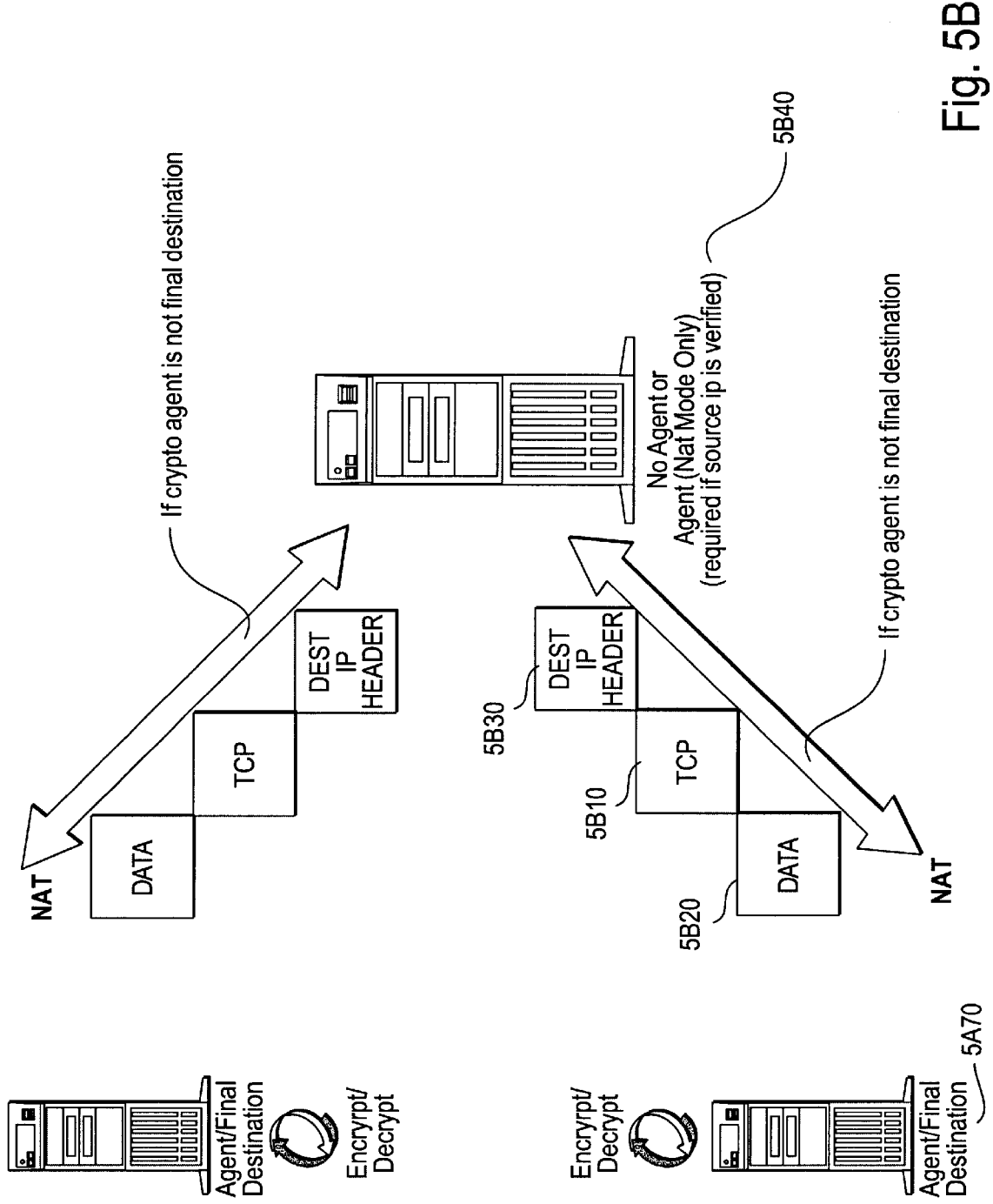
FIG. 5B shows a final destination packet Network Layer Model decomposition in accordance with an aspect of the invention.

7. Agent N decrypts the packet that was sent to it and either sends it up the stack (reads) clear text data or forwards clear text data to final destination. The decryption process itself is closely tied to the cipher being used. This invention employs the established standard ciphers e.g., DES and RC4, and decryption of each packet would depend on the type of encryption standard employed. The packet processing is shown in FIG. 5B. Again, the agent processed packets are broken down into boxes to show the individual network model layer in each packet. Note that the AGENT IP HEADER, ESP, AH and AGENT ID IP HEADER layers have been stripped off by the agent. The remaining DATA 5B10, TCP 5B20, are pre-appended a DESTINATION IP HEADER 5B30, and then forwarded to the final destination host 5B40, in FIG. 5B for reconstitution of individual packets.

Figure 7:
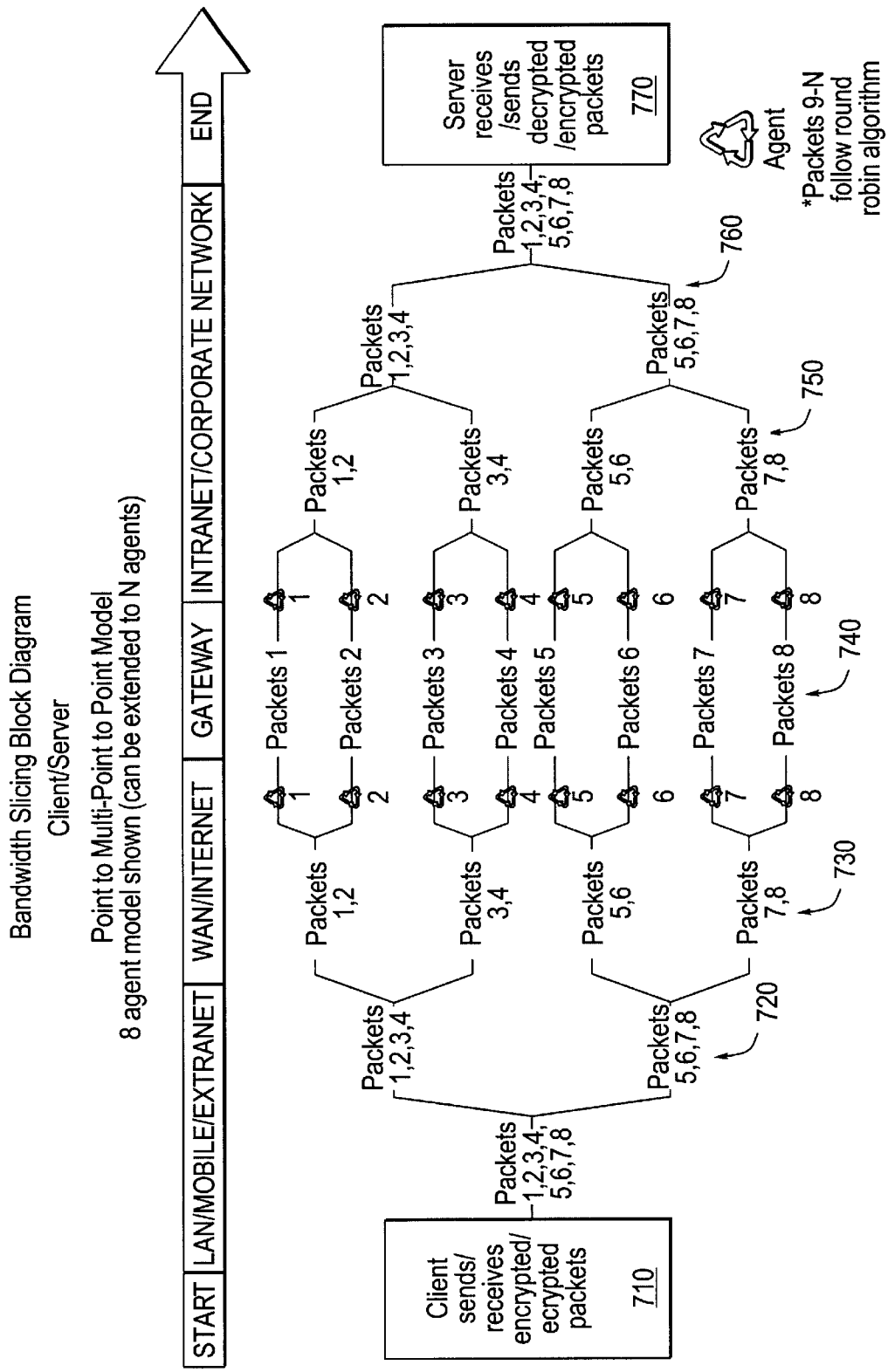
FIG. 7 shows discrete packet transport across a network in accordance with an aspect of the invention.
Figure 8:
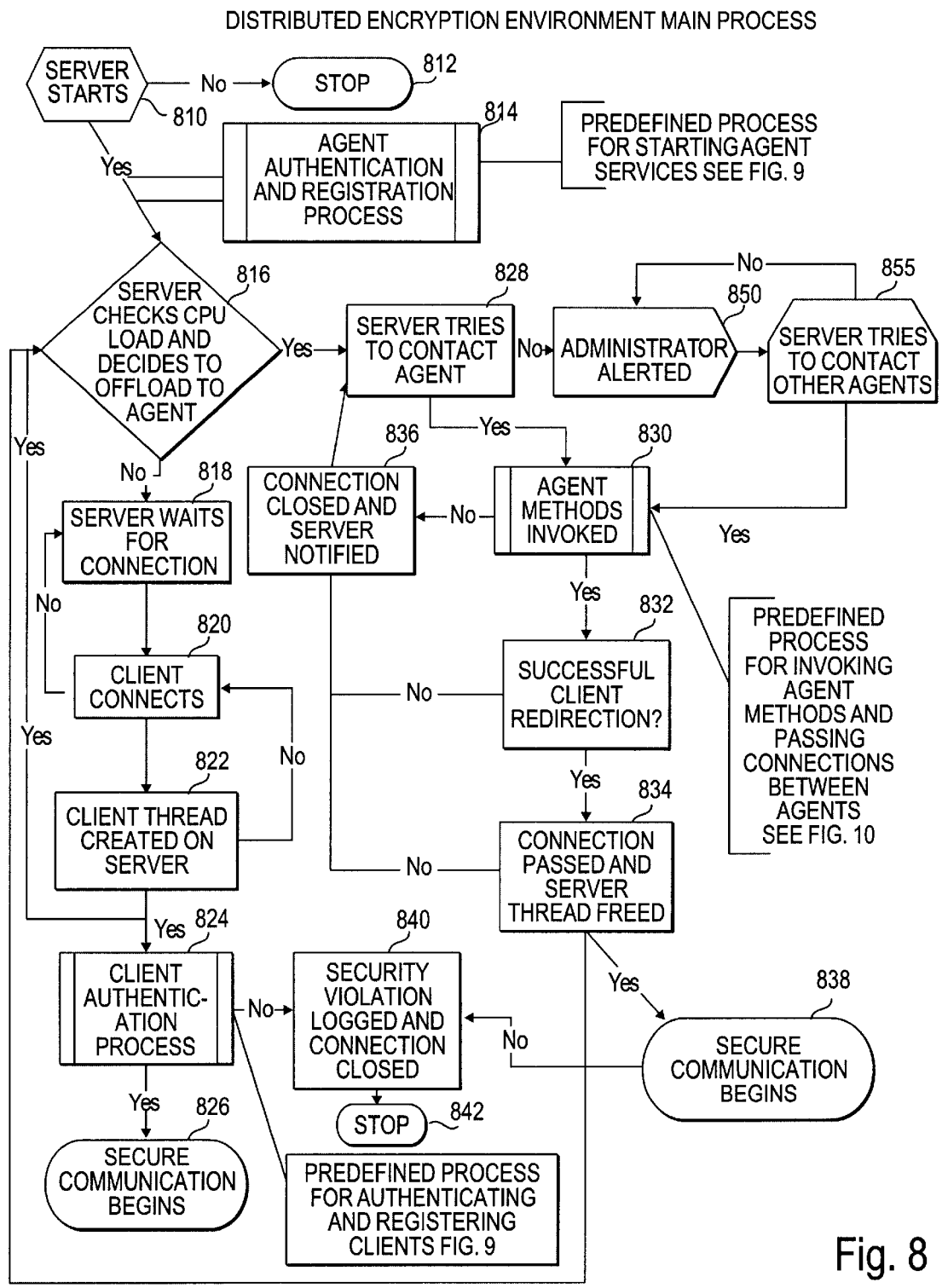
FIG. 8 shows a flowchart of the invention main process in accordance with an aspect of the invention.

N Agents working in parallel on an encrypted stream are shown in FIG. 7 in a more general form. This figure shows the mode where the application data is broken into M discrete packets and sent through encryption XOR chain. These packets are encrypted separately by the low level process 710. The figure shows 8 such packets for an example. The packets traverse routers and spread as they follow the shortest path to the agents 720. More diffusion occurs as packets continue on their journey 730 Packets from each application part reach their assigned agent and are decrypted individually 740 shows the packets destined for the same device begin to draw closer and packet concentration occurs 760 as packets get closer to the destination. Decrypted packets reach the destination and are reassembled 770.

These general stages above can be further broken down into more detail. FIG. 8 through FIG. 12 contain flow charts, which depict the process aspect of the invention in more depth. The flow begins in the upper left hand corner 810 of FIG. 8 and continues to 1250 in FIG. 12. The process is discussed directly below.

Distributed Encryption Environment Main Process

If the main server 810 starts successfully, it proceeds to authenticate an agent and begin a registration 814. This part of the process is continued in FIG. 9. Upon finishing 814 and returning, the main sever checks CPU load to decide 816 whether or not to offload work to an agent. Affirmative leads to 828, where the server tries to contact an agent. If no contact is established, then the Administrator is alerted 850 and the server tries to contact other agents 855. That is accomplished at 830 by invoking the agent methods sub-process, which is continued in FIG. 11. If the agent method fails to invoke, then the connection is closed 836, the server is notified and the server tries to contact another agent 828. If the agent method is successful, a client redirection 832 is attempted and success will lead to a client connection being passed from the server to the agent and a freeing of that server thread 834. A negative will initiate closing of connection and server notification 836. Once a connection is passed and server thread freed 834, then a secure communication begins 838. In the event of an error, a security violation is logged 840 and the connection is closed. If the server decides not to offload the demand for service to an agent 816, then the server waits for a client connection 820. If the client connects, then 822 a client thread is created on the server. The server checks to see if it has sufficient CPU resources 816 and begins 824 a client authentication process, which continues in FIG. 10. If the client authentication process is successful, then 82 secure communication begins.

Authentication and Registration Sub-process

The sub-process begins by attempting a 905 multiparty key agreement, MKA. A failure will prompt a security violation log and connection termination 915. A success will force the process to proceed to 910 initiation of a secure message communication. This leads to 925 client/agent supplying authentication credentials. Any failure in the previous two steps will be logged and a security violation flagged, followed by connection termination 915. A successful client/agent authentication 925 leads to a registration event on the main server 930.

Client Sub-process

Figure 9:
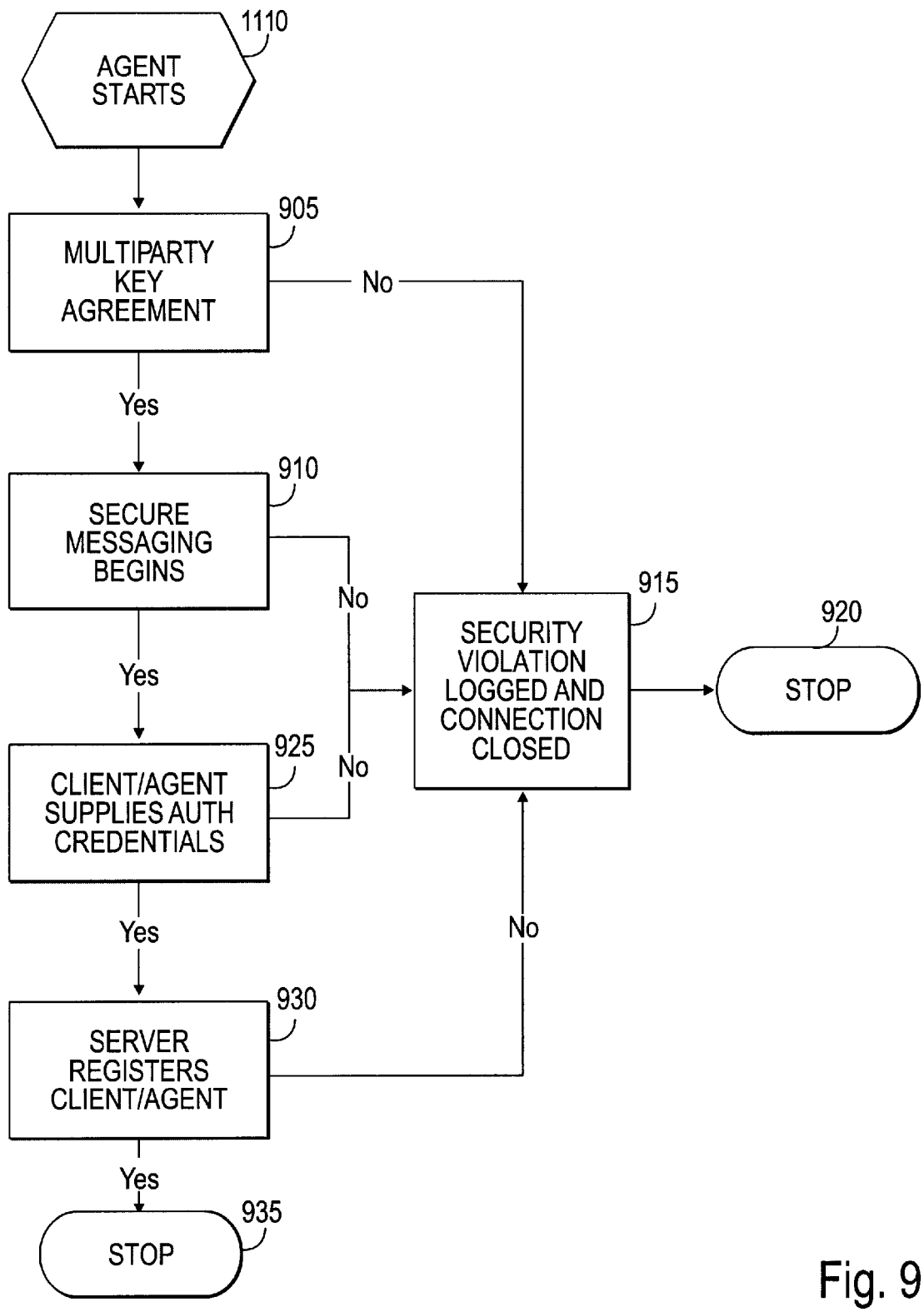
FIG. 9 shows a flowchart of the authentication and registration process in accordance with an aspect of the invention.
Figure 10:
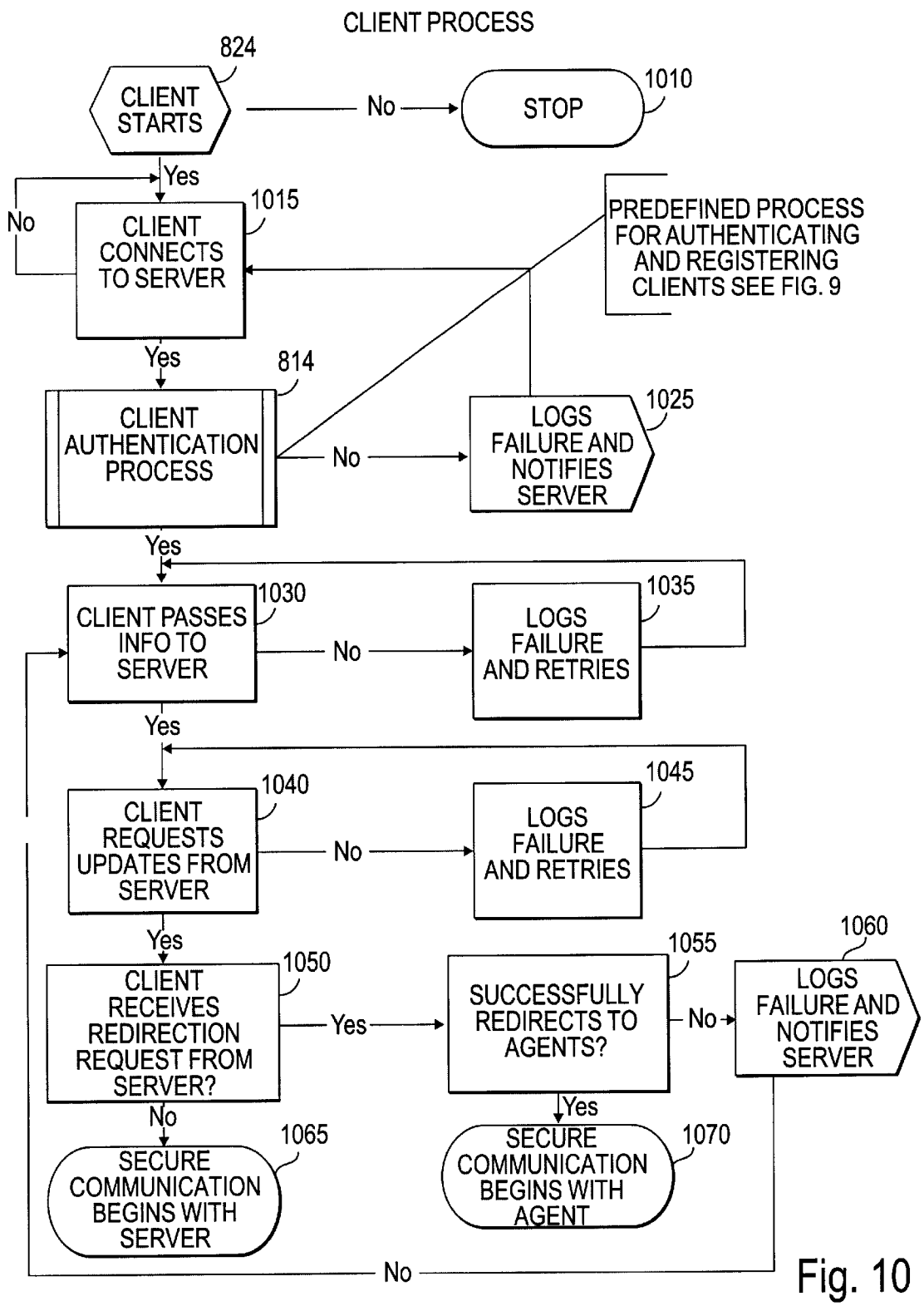
FIG. 10 shows a flowchart of the client process in accordance with an aspect of the invention.
Figure 11:
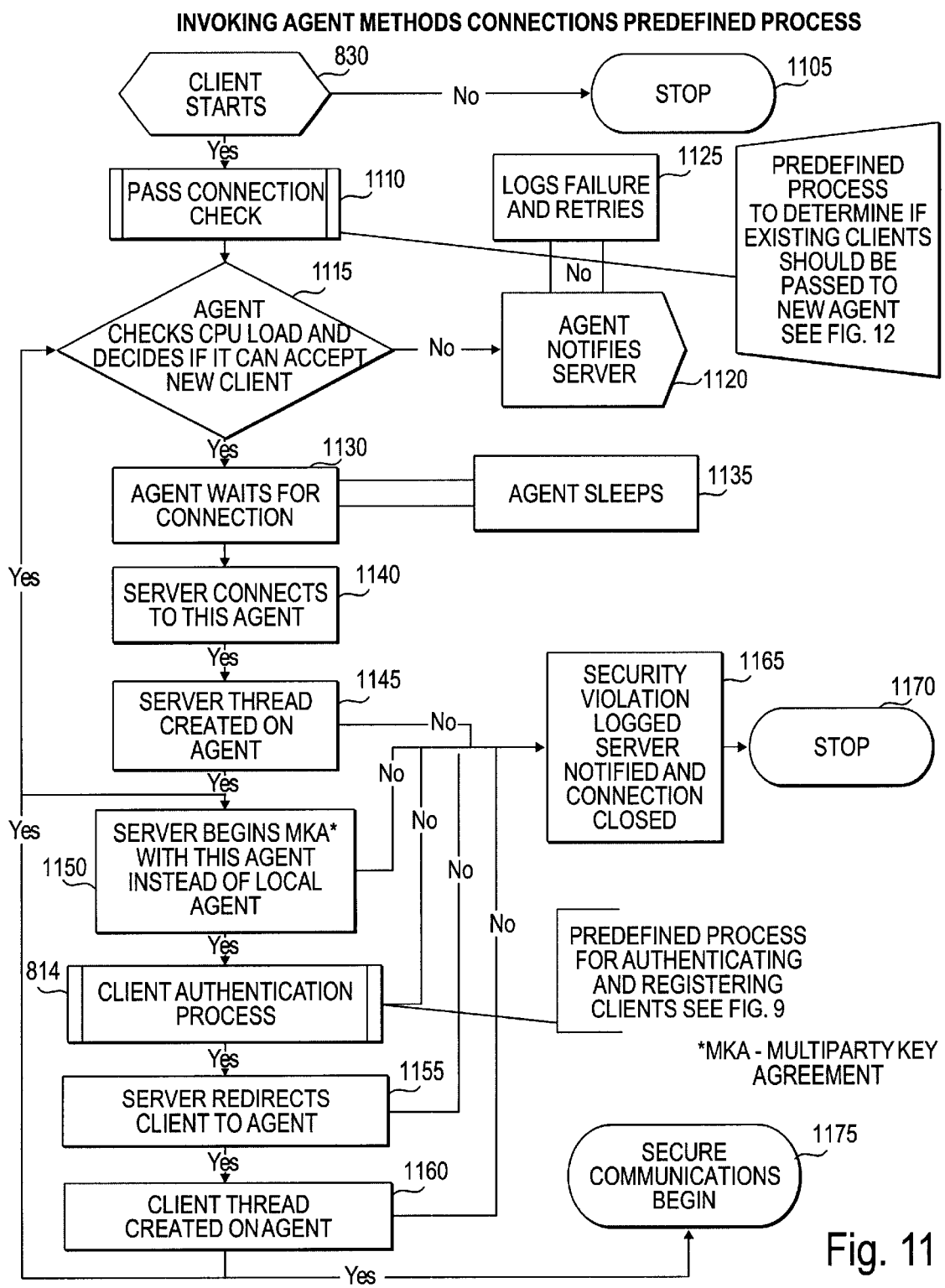
FIG. 11 shows a flowchart of invoking agent methods connections process in accordance with an aspect of the invention.

The client sub-process begins by attempting to connect to the main server 1015. If this is successful then 814 client authentication sub-process is initiated as shown in FIG. 9. A failure to authenticate will prompt a failure log and 1025 server notification. A successful client 814 authentication will lead to 1030 information passing from client to server. If information passing was unsuccessful, then a failure is logged 1035 and the attempt retried. If information passing 1030 was successful, then the client requests an update from server 1040. An update failure is logged and a retry attempt is made 1045. If successful, the client receives a redirection request from the server 1050. If redirection is accepted 1055, then the client attempts to redirect to agent. If this is successful, then 1070 secure communication begins with the agent. In the event that redirection 1050 request failed, then secure communication begins with the server.

Invoking Agent Methods Connection Sub-process

Figure 12:
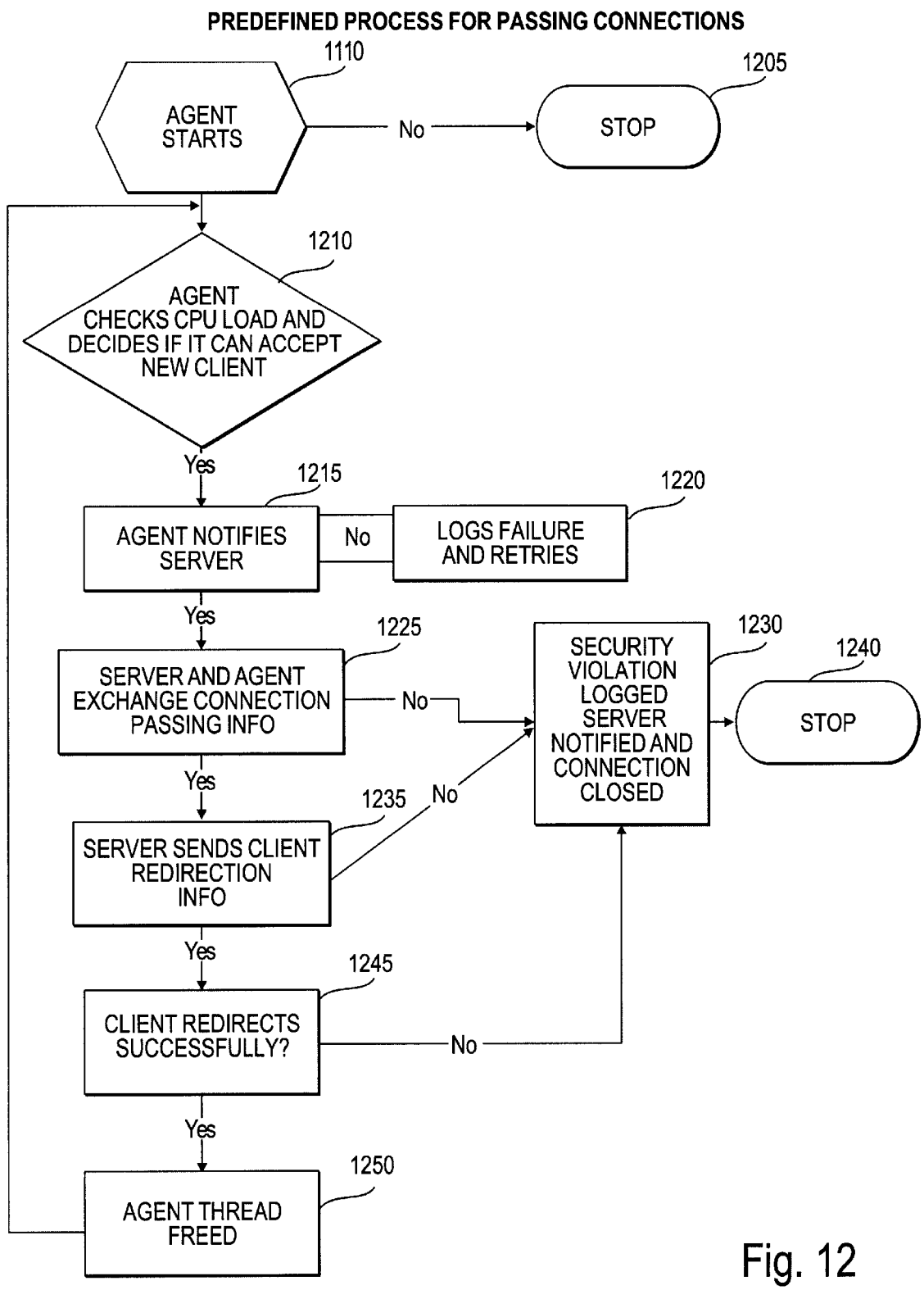
FIG. 12 shows a flowchart for passing session connections in accordance with an aspect of the invention.

Successfully invoking the agent authentication process starts a pass connection check 1110, refer to FIG. 12, followed by the agent performing a CPU load check 1115 to decide if it can accept anew client connection. If the agent cannot accept more work, then it notifies the main server 1120 and if that fails, then it logs a failure and retires 1125. If a load check indicates sufficient resources are available, then the agent waits for a connection 1130. An agent connection 1140 with the server spawns a server thread 1145 on the agent. A failure to create the server thread will prompt a security violation log entry and sub-process termination 1165. A successful server thread creation initiates a multi-party key agreement, MKA, with the agent. If this is successful, and then a client authentication sub-process 814 begins, see FIG. 9. Success will cause the server to 1155 redirect the client to agent and further to 1160 spawn a client thread on the agent. Any failures in the previous four steps will prompt a security violation logging, sever notification and sub-process termination.

Process for Passing Connections

Invocation of this sub-process will prompt the agent to check its CPU load and decide if it should pass existing client 1210 off. An affirmative will lead the agent 1215 to notify the main server. Failures are logged followed by a retry 1220. Success allows the server and agent to exchange connection passing information 1225 followed by the 1235 server sending the client redirection information. A further success prompts the client to attempt to redirect 1245. If the client redirection is successful, then the agent thread is freed. Any failures in the previous three steps will initiate security violation logs and sub-process termination 1230.

Parallel Processing and Reconstitution

One of the novel features of this architecture is that client partitions of encrypted bandwidth are assigned to individual agents or multiplexed to process and decrypt. This is a new and non-obvious application of distributed algorithm technology as applied to encryption and decryption and greatly enhances scalability. This process implementation is based on automata mathematics, as is well understood. The formalized mathematics can be found in Nancy A. Lynch's, "Distributed Algorithms", Morgan Kaufmann Publishers, 1996. The implementation of the theory to this application is described directly below.

The model is an asynchronous concurrent system. An Input/Output automaton is defined as a simple type of state machine in which the transitions are associated with named actions. Actions are classified as input output or internal. I/O automata are combined using a repetitive composition operation to form an N level automaton, which represents the concurrent system. The input for this system operating in the forward direction is an encrypted IP packet. The internal action is the decryption of the packet. The output is the unencrypted packet. The internal function of decryption occurs on each agent is visible only to that particular agent. There is another tuple of [input, process, agent response,] for controlling the agent. An example is [add new client IP to table (server message to agent), agent adds IP entry, agent responds with "client added" message]. The input for this system is the server control message, the internal action is the processing (the agent makes a decision based on the control message) of that message. The output is the response. An in-depth explanation of the implementation of the processing algorithm in a distributed network using automata follows directly below.

Figure 3:
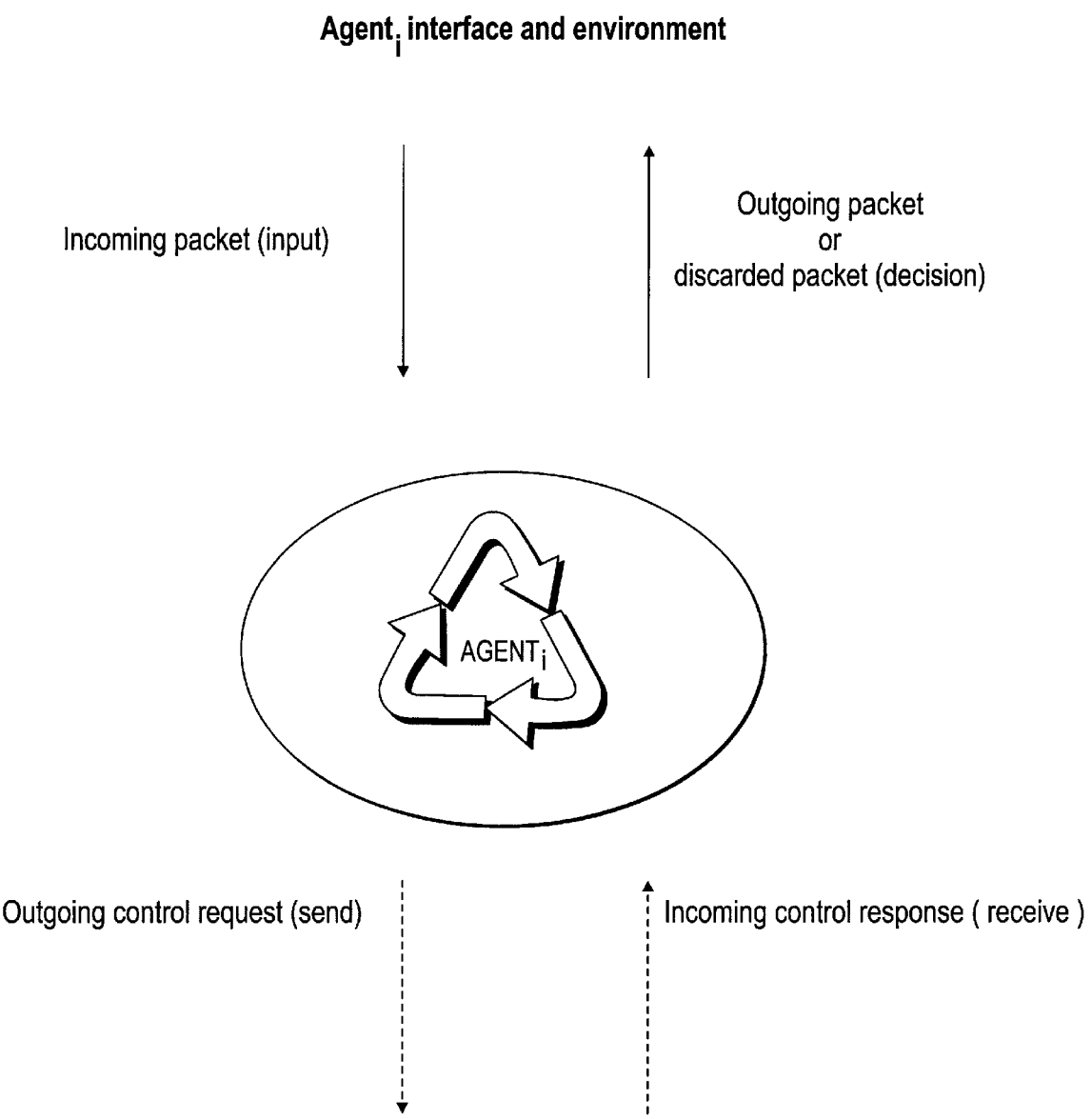
FIG. 3 shows an agent interface and environment in accordance with an aspect of the invention.

Process automaton Pi, see FIG. 3, represents an agent in the system. Configuration and synchronization of process Pi occurs via send and receive messages send(m)ij and receive (m)j,i.

Listed below are the definitions of the five components of the automaton. Each automata (agent) contains these five components which fully describe the automata. Since the automata are identical in their external and internal characteristics and behavior, it is possible to compose them into a automaton that, once described in terms of the following five components, completely describes each automata within the system.

The first component is the signature. The signature S of the system consists of the set of three disjoint actions, input, process, output; in(S) represents the input set, proc(S) represents the process set and out(S) represents the output set. External actions consist of the union of in(S) ∪ out(S) and local actions consist of the union of out(S) ∪ proc(S). The union of the in(S) ∪ proc(S) ∪ out(S) represents all actions of the signature S. The external signature (also known as the external interface) of S, extsig(S) is defined to be the signature (in(S),out(S),0).

sig(A), a signature

The second component defines the set of possible states of sig(A). Each action may or may not result in a change of state for the automaton. Changes may be simple such as loading a byte onto a stack for processing or more complex such as a DES-CBC computation where the passing of a cleartext byte(octet to be more precise) to the cipher results in 16 subsequent XOR operations and at least 16 state changes of that cleartext byte.

states(A), a finite set of states

The third component defines the set of initial state/s of the automaton. The start states are the nonempty elements of states(A) set that exist when the system is initialized start(A), a nonempty subset of states(A) known as the start or initial states The fourth component defines the set of changes in state as the system becomes active.

trans(A), a state transition relation, trans(A) ⊆ states(A) x acts(sig(A)) x states(A)

The final component defines the set of equivalent actions that occur within an automata. These are commonly called threads.

task(A), a task partition

Transitions (s, π, s') is an element of trans(A). π represents an action the causes a change in state. Since an agent requires an input packet to change state, we say that state s is considered quiescent. This means that an agent can and will accept additional input packets even if it has not processed all of the previous packets. It will simply use a vector table function, which will grow and shrink as needed or a fixed sized array to store packets until they are processed (limited to the amount of available memory on the processor to create the vector or array). Unexpected packet input (corrupt packets, malicious packets or unsecured packets) result in silent destruction of the packets and a security violation flag set for the server to see when it polls the agent.

There are three tasks (or threads) that occur on the agent. The first is receiving control commands from the server. The second is sending and receiving messages to/from the server. The final task is participating in the encryption and decryption of packets. Each task runs in a separate thread.

The process I/O automaton is shown below. Here we focus on the packet processing tuple in the forward direction. For simplicity, this assumes that the client has already been authenticated and the agent is ready to begin processing packets.

V is a fixed value set v∈V (v is a ciphertext packet).

Signature(Actions)

Input:

init($v$)$_i$, v∈V; Initialization occurs at the moment the packet arrives at the agent. The system initializes with a null value (before a packet arrives) but this case is thrown out since it gives no information about the systems characteristics or behavior.

receive($v$)$_{j,i}$, v∈V, $1 \leq j \leq n, j \neq i$; The agent puts the received packet from the server (j) onto the internal stack to await processing. The restrictions that are placed on this action are that at least one sender must exist and that sender cannot be the agent itself Internal:

decide($v$)$_i$, v∈V; The agent must decide what to do with the packet. It can decrypt it or discard it.

Output:

send($v$)$_{i,k}$, v∈V; v∈V, $1 \leq k \leq n, k \neq i$ The agent sends the packet to one or more (in the case of multicast groups) final destinations (one of which may be itself). The restrictions are that there must be at least one receiver and it cannot be the sender.

discard($v$)$_i$, v∈V; The agent discards the packet

States and Start States:

packetval, a vector that is indexed by $\{1, \ldots, n\}$ which represents the current states of the packets in V. All of the packets are initialized in V as properly encrypted or currupt packets. Next, one by one, each packet exists in V as decrypted or null based on the processing decision of the agent. Here is an example showing the various states of two bytes. The first byte is a valid encrypted byte. The second represents a corrupt byte.

| V(inital) | V(input) | V(internal) | V(output) |
|---|---|---|---|
| Null | 11110011 | 11101111 | 11101111 |
| Null | 11110000 | 00000011 | null |

Transitions

The transitions for the above states are as follows:
For the valid byte:
    $init(v)_i$, $v \in V \rightarrow receive(v)_{j,i}$, $v \in V \rightarrow val(j):=v \rightarrow decide(v)_i$, $v \in V$ (val(j) cannot be null)$\rightarrow v'=f(val(j)) \rightarrow send(v')_{i,k}$
For the invalid byte:
    $init(v)_i$, $v \in V \rightarrow receive(v)_{j,i}$, $v \in V \rightarrow val(j):=v \rightarrow decide(v)_i$, $v \in V$ (val(j) cannot be null)$\rightarrow v'=f(val(j)) \rightarrow val(j):=null \rightarrow discard(v')_i$ Tasks:

The two tasks that are operating as separate threads are $send(v)_{i,k}$ and $discard(v)_i$ There are no further state changes to val(j) when these tasks are executed (until the next round).

Sample successful execution on an automata (Agent)
[ ]represents the packet buffer on the agent
ffddeeaabbcc represents the ciphertext block (also works for stream input)
hello world! represents the plaintext block
λ denotes the empty sequence
[λ], receive(ffddeeaabbcc)$_{i,j}$,[ffddeeaabbcc],decide (ffddeeaabbcc)$_{i,j}$,[hello world!], send[hello world!]$_{i,k}$, [λ] . . .

Sample unsuccessful execution on an automata (Agent)
[λ], receive(ffddeeaabbcc)$_{i,j}$,[ffddeeaabbcc],decide (ffddeeaabbcc)$_{i,j}$,[null], discard[null]$_{i,k}$, [λ] . . . .

The synchronization process is a necessary part of the automaton or complete system. The agent is a process running on a distributed system. Each client is a process running in the system. The gateway server is in the middle. FIG. 6 shows these host topology relationships. In order to make the single-to-many connection (1 client, N agents) which is the implementation of the bandwidth "slicing" technique, portions of the bandwidth are equally divided among the N agents for processing.

Since the server is responsible for authenticating and connecting the parties, it serves as the synchronizer. The agent and client processes have to be synchronized or else they cannot communicate. Encrypting and decrypting can be accomplished without this but it creates a bottleneck at the gateway. This is why current secure network solutions are using hardware to help mitigate that bottleneck. None of those existing hardware solutions deal with high volume traffic by any other means but by adding more hardware into the system. Thus, this software solution overcomes the need for addition encryption/decryption hardware.

The system architecture maintains certain conditions or restrictions, which must exist to enable optimal composition of automata. The true value in this system is seen when automata are composed. The fact that each automaton exhibits identical characteristics and behavior makes it possible for their I/O executions to be composed thereby increasing the number of operations that can be performed in the same time slice. This conclusion is based on Cartesian multiplication and implemented in this architecture. According to Lynch, reference cited above, there are three restrictions that must be met in order for this type of composition to be valid. These necessary conditions are designed to exist in the system for the wire-speed performance levels.

Figure 13:
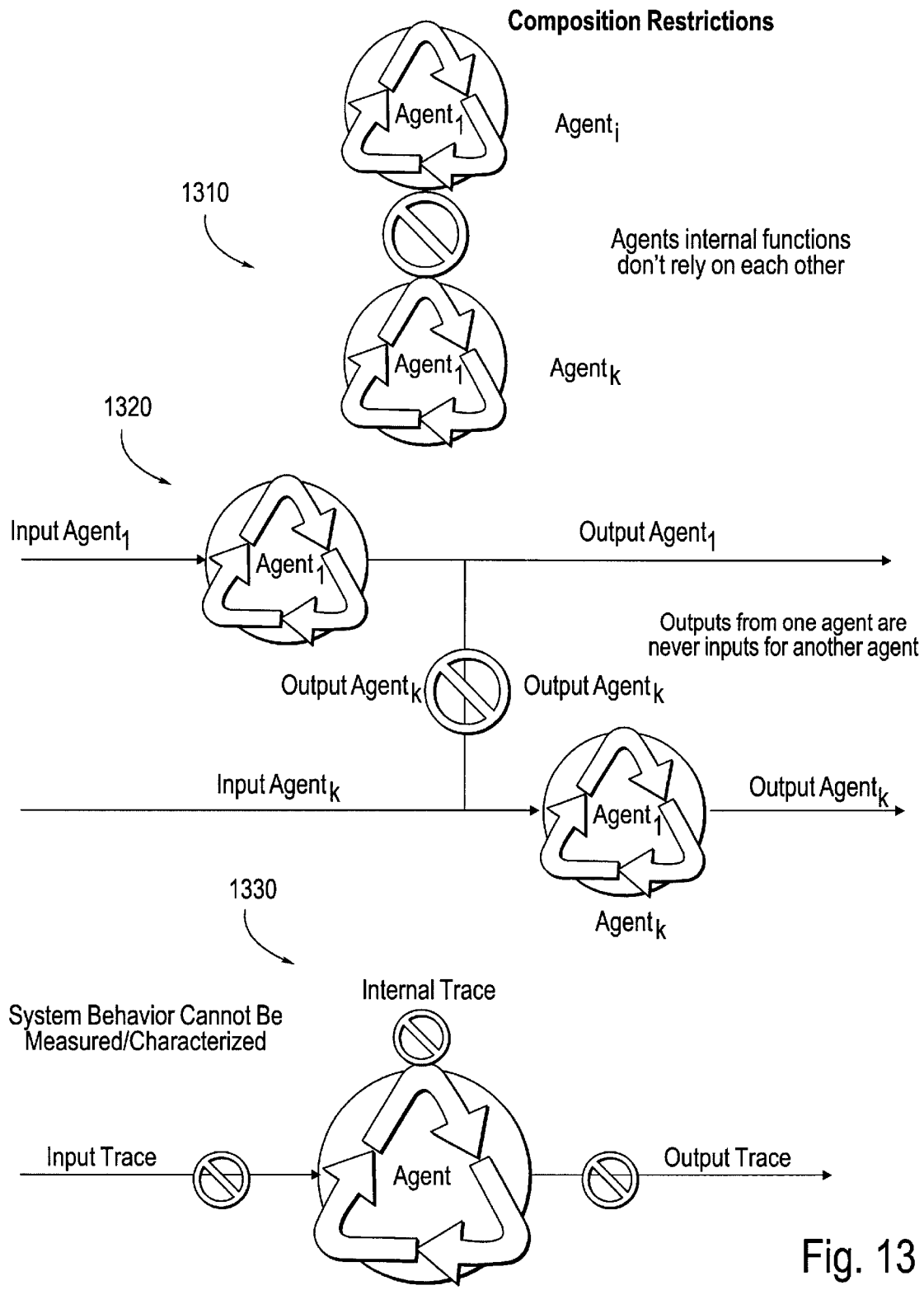
FIG. 13 shows the automata composition restrictions in accordance with an aspect of the invention.

First, there must be a total independence among the agents. If one or more agents rely on each other for data transfer and one of them went offline, then the other(s) would stop working. In other words, with respect to the internal actions of any two automata in the system, one cannot affect the other in any way. A violation of this condition would introduce chaos into the system via the avalanche effect if agent after agent began dropping out of the system on the account of one failure. This is shown pictorially in 1320 of FIG. 13.

Second, the output of one agent cannot become the input of one or more other agents because to do so would introduce feedback into the system which will bring the entire system (and probably the network) to a halt in a short period of time. It will be possible for one agent to forward data to another after it's been decrypted since in that case the receiving agent is treated as an end host instead of an agent. This is pictorially depicted at 1320.

Figure 14:
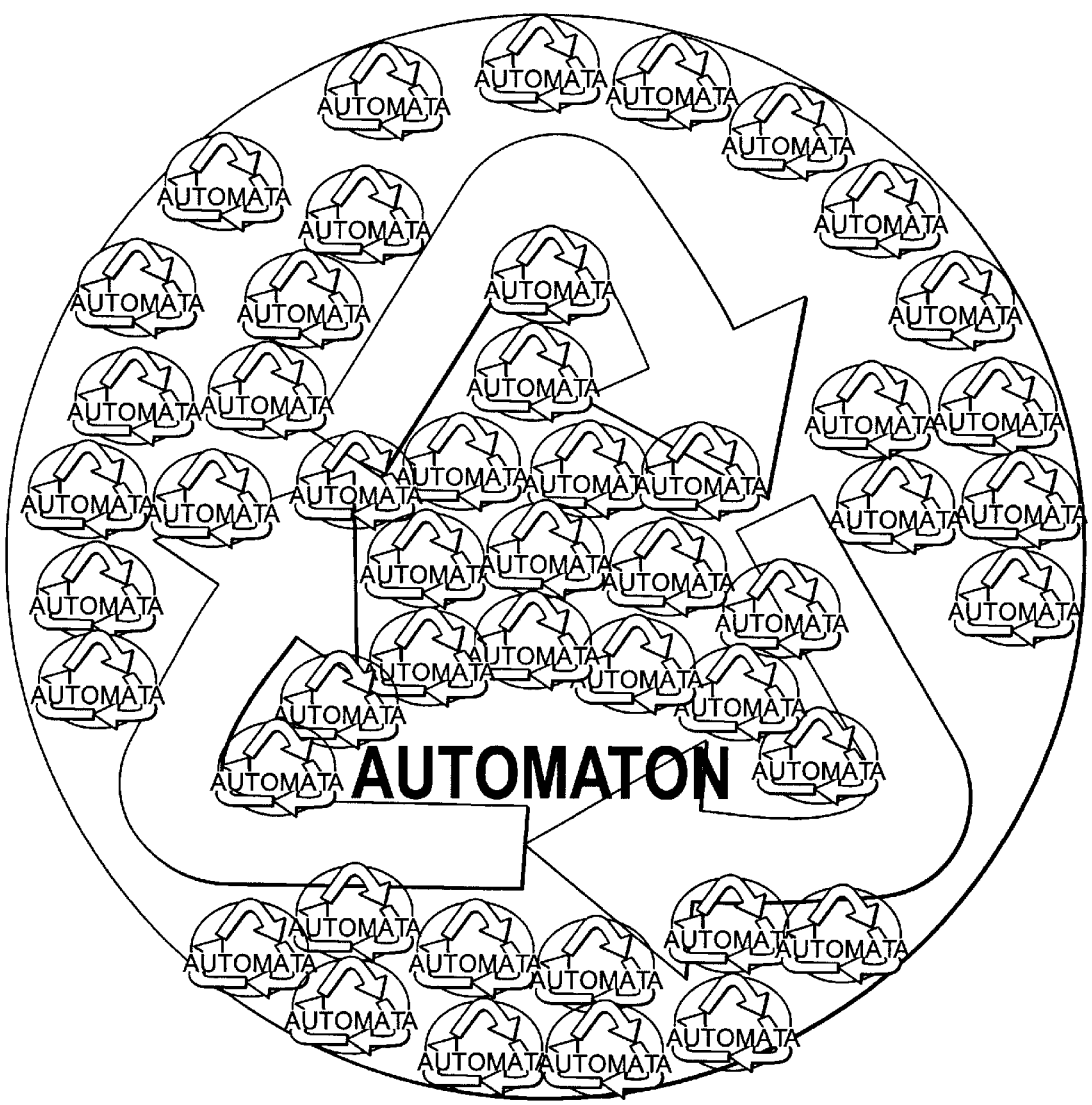
FIG. 14 shows the overall relationship between automata and the automaton in accordance with an aspect of the invention.

Thirdly, it is required that a finite number of agents exist in the system. Since infinity is a large number, the practical limitation of this condition is small and at least one agent can be generated to satisfy the zero condition. This is pictorially depicted at 1330. FIG. 14 shows the overall relationship between automata and the automaton.

Figure 1:
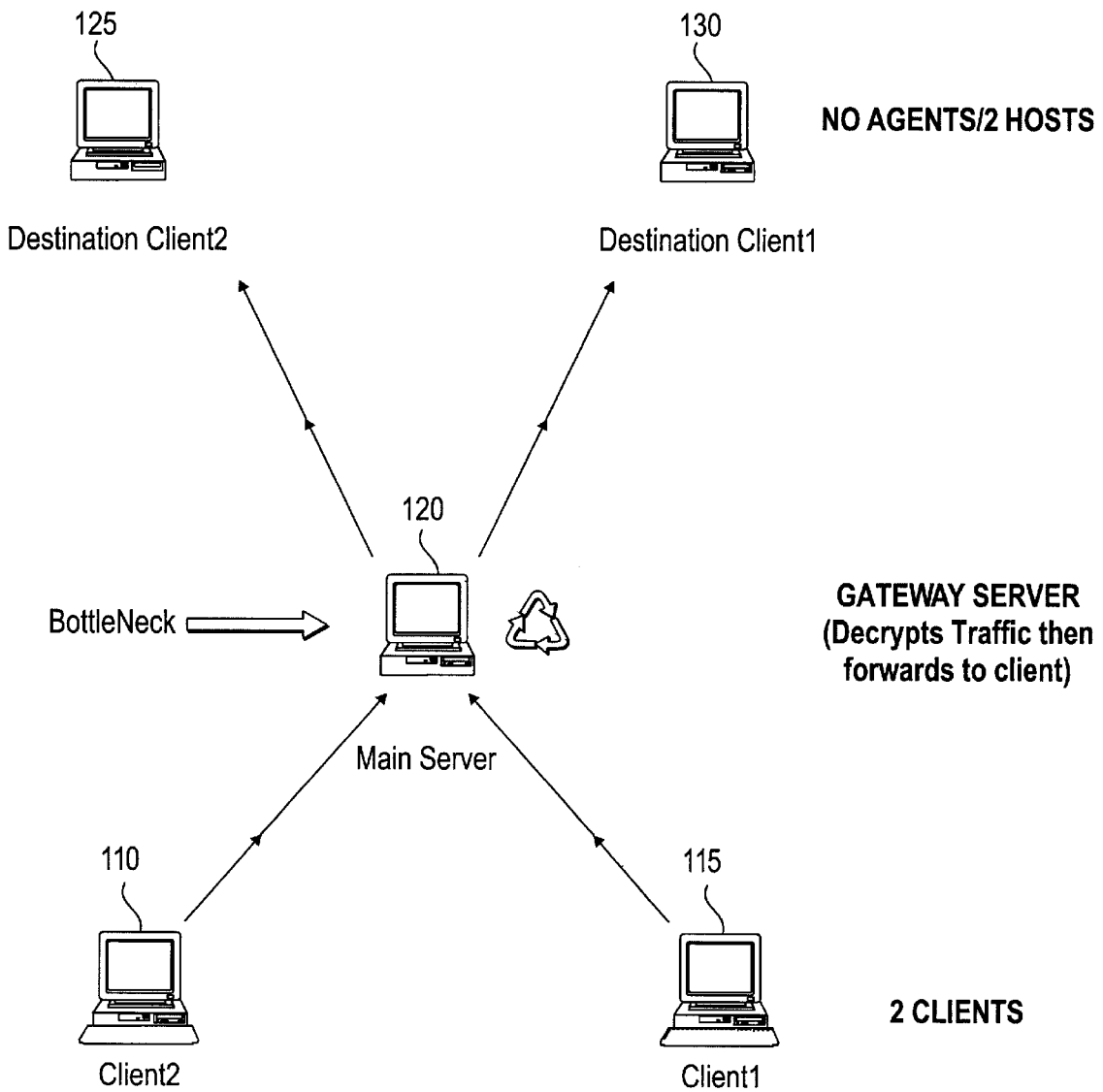
FIG. 1 shows a test configuration for performance measurements for a conventional network architecture.
Figure 2:
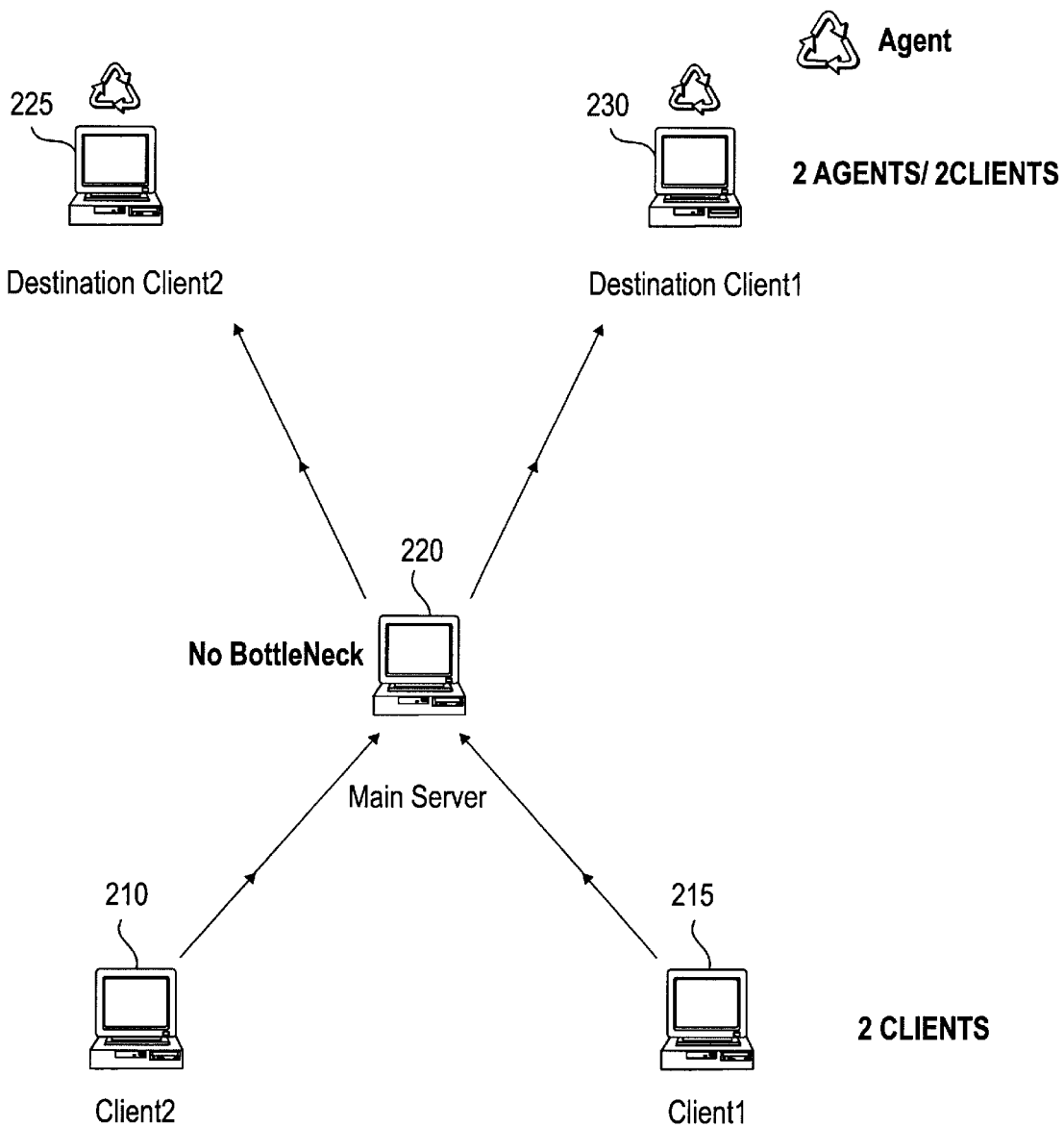
FIG. 2 shows a CryptoScale test configuration for performance measurements in accordance with an aspect of the invention.

The foregoing advantages of the present invention were proved in laboratory performance tests, which show the effectiveness of the present invention as compared to conventional architectures. The test configurations are shown in FIG. 1 and FIG. 2. FIG. 1 shows the Test Case 1, where a configuration employed a gateway server, which decrypted traffic before forwarding to the final destinations. In this configuration client1 110 and client2 120 opened secure communication with destination client1 125 and destination client2 130. Decryption was accomplished on the Main Server 120 and then decrypted packets were sent to final destinations. The average CPU usage, system load and packets per second are shown below for over 100 test runs.

DET Test Case 1
Server Running on Solaris
1 Agent Running on Main Server
3 NT Clients/1 98 Client

| Date/Time/System | CPU | System Load | Packets/sec |
|---|---|---|---|
| 01/11/98 13:54–14:04/SUN 1 | 99.96 | 1.28 | 1133 |

FIG. 2 shows The Test Case 2 configuration employed the invention architecture. This configuration performs the network address translation at the main server 220 and hands the decryption work off to the agents running on the final destination hosts 225 and 230. The results given below show a roughly double packet per second throughput performance. The average CPU usage, system load and packets per second are shown below for more than 100 test runs.

DET Test Case 2
Server Running on Solaris
2 Agents Running on NT
3 NT Clients/1 98 Client

| Date/Time/System | CPU | System Load | Packets/sec |
| --- | --- | --- | --- |
| 01/11/98 14:53–15:04/SUN 1 | 78.1 | 0.808 | 2206 |

While the invention has been described in connection with what are presently considered to be the most practical and preferred embodiments, it is to be understood that the invention is not limited to the disclosed embodiments, but rather is intended to cover various modifications and equivalent arrangements which are included with the spirit and scope of the following claims.

I claim:

1. A software architecture for conducting a plurality of cryptographic sessions over a distributed computing environment, comprising:

a registration entity or registry residing within a main server entity;

an agent server entity communicating with said main server;

a client entity communicating with said main server and agent server;

a plurality of distributed networked computers providing a mechanism for executing said main server entity, agent server entity, and client entity;

a defined protocol for initiating secure communication between the main server and agent server; over said network; and a system for providing one or more communication sessions among the main server, agent server and client entity for implementing a client decrypted bandwidth reconstitution which enables the recombination of individual parts of the decrypted client bandwidth among N agents processing in parallel.

2. A system according to claim 1 comprising:

means for discovering said agent servers;

means for determining an available processing bandwidth of the main server and agent servers means for registering said main server and available agent server with said registration entity.

3. A system according to claim 1 wherein said system for providing one or more communication sessions among the main server, agent server and client entity comprises partitioning the client bandwidth among N agents such that every agent receives 1/N of the encrypted bandwidth.

4. A system according to claim 1, wherein the system for establishing communication sessions among the main server agent and client comprises automata composed according to the restrictions of:

limiting control communication between the agent and server only;

accepting input/output from a gateway server only; and requiring a finite number of automata to exist.

5. An end to end encryption/decryption system implementable in software for a distributed network comprising:

one or more networked computers;

a main server communicating with said networked computers, said main server including a registration entity;

one or more agent servers communicating with said main server for defining one or more session keys for establishing secure connections with said networked computers such that when the main server receives notification that an agent server is saturated, the main server finds an alternate agent server and passes the session key to the alternate agent server and notifies a corresponding networked computer to redirect the secure session to the alternate agent server.

6. A method for implementing a scaleable software crypto system between a main server and one or more agent servers communicating with one or more clients such that performance of the crypto system is increased to meet any demand comprising providing a secure communication between the main server, agent server, and one or more clients such that communication between the main server and agent server automatically enlists additional agent servers to support incremental secure sessions so as to maintain performance at a desired level.

7. A method for conducting a plurality of cryptographic sessions in parallel over a distributed computing environment including one or more agents, a server and one or more clients comprising:

establishing a secure cryptographic session environment;

initiating secure communication with a main server and define one or more session keys with which to establish secure sessions; and transferring secure sessions, such that the main server and one or more agent servers become enabled to receive secure sessions from clients;

such that establishing, initiating, and transferring secure cryptographic sessions provide N simultaneous scalable secure cryptographic sessions among agents, server and clients.

8. The method of claim 7 wherein establishing a secure cryptographic session comprises:

registering one or more agent servers with the main server; defining one or more session keys, such that the main server and agent servers become enabled to receive secure connections with the clients.

9. The method of claim 7 wherein initiating secure communication comprises;

connecting one or more clients to the Main Server for authenticating; and determining if the Main Server can accept a new session based on current available processor bandwidth of said main server; and agreeing on a secret session key with the one or more clients; and enabling one or more available Agent Servers to become unblocked and participate in a multiparty key exchange between a Client, Main Server and Agent Server when the Main Server has insufficient resources to service the session; and denying a client connection when main server and agent servers are unavailable; and maintaining a list of connections or sessions and associated session information and session keys; and terminating encrypted session communication upon successfully transferring a session from main server to one or more agents.

10. A method for distributed encryption/decryption implemented in software across a computer network employing a distributed automaton comprising M automata for servicing a plurality of N simultaneous crypto sessions which provides bandwidth scalability limited only by the M automata comprising:

sharing spare CPU cycles of the computer network for encrypting and decrypting communication to provide N simultaneous secure session among said network of computers.

* * * * *

UNITED STATES PATENT AND TRADEMARK OFFICE
CERTIFICATE OF CORRECTION

| | | |
|---|---|---|
| PATENT NO. | : 6,484,257 B1 | Page 1 of 2 |
| APPLICATION NO. | : 09/259885 | |
| DATED | : November 19, 2002 | |
| INVENTOR(S) | : Alonzo Ellis | |

It is certified that error appears in the above-identified patent and that said Letters Patent is hereby corrected as shown below:

In the Claims

Column 15, line 15, cancel the text beginning with "1. A software architecture" and ending with "processing in parallel" in column 15, line 35, and insert the following claim:

--1. A system for conducting a plurality of cryptographic sessions over a distributed network of computers, employing a distributed automaton running on the network comprising M agents for servicing N number of simultaneous cryptographic sessions wherein bandwidth and number of sessions are scalable by the M agents and latency is potentially reducible to zero comprising:
    a main server;
    one or more clients communicating over the distributed network with said main server and agents;
    M agents communicating with the main server for enlisting additional agents to support incremental cryptographic sessions with the clients to maintain system performance at a desired level; and for encrypting and decrypting communication traffic as it arrives from the clients via the main server, the agents comprising a single-to-many connection (1 client, M agents) with respect to the clients, such that portions of the bandwidth are equally divided among the M agents for processing, and the agents combine the processing power of all computers connected to the system to service encryption and decryption and enable bandwidth to be scalable by the M agents and to reduce latency substantially to zero.--

Column 15, line 55, delete "imple-"
Column 15, line 56, delete "mentable in software"
Column 15, line 60, insert --and-- after "entity;"

Column 16, line 11, delete "automatically"
Column 16, line 12, delete "so as to maintain" and insert --in response to maintaining--

Signed and Sealed this
Twenty-fourth Day of February, 2015

Michelle K. Lee
*Deputy Director of the United States Patent and Trademark Office*

CERTIFICATE OF CORRECTION (continued)
U.S. Pat. No. 6,484,257 B1

Column 16, line 14, cancel the text beginning with "7. A method for conducting" and ending with "server and clients" in column 16, line 28, and insert the following claim:

--7. A method for conducting a plurality of cryptographic sessions in parallel over a distributed computer network including a main server, M agents communicating with the main server, each agent having a central processing unit (CPU), and one or more clients communicating with the agents, wherein the agents operate as a distributed system to share the load of the encryption and decryption over all of the spare CPU cycles of the computer network for providing a plurality of N simultaneous crypto sessions having bandwidth scalability limited only by the number of agents comprising:

initiating secure communication with the main server and defining one or more session keys with which to establish secure sessions, wherein communication between the main server and agents enlists additional agents to support incremental secure sessions in response to maintaining performance at a desired level; and determining if the main server can accept a new session based on current available processor bandwidth of the main server;

notifying the main server when an agent is saturated, passing the session key to an alternate agent and notifying a corresponding networked client to redirect the secure session to the alternate agent;

transferring secure sessions, such that the main server and one or more agents become enabled to receive secure sessions from clients, such that transferring secure cryptographic sessions provide N simultaneous scalable secure cryptographic sessions among agents, server and clients in a distributed network and the processing power of all computers connected to the system combines to enable bandwidth scalability limited only by the M agents.--